(12) United States Patent
Alexander et al.

(10) Patent No.: US 10,727,563 B1
(45) Date of Patent: *Jul. 28, 2020

(54) DEVICES, ASSEMBLIES, AND METHODS FOR MOUNTING A WIRELESS ACCESS POINT TO A POST

(71) Applicant: CSC Holdings, LLC, Bethpage, NY (US)

(72) Inventors: Michael Alexander, W. Hempstead, NY (US); Robert Anderson, Levittown, NY (US); Alvin Clark, Bethpage, NY (US)

(73) Assignee: CSC Holdings, LLC, Bethpage, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/117,682

(22) Filed: Aug. 30, 2018

Related U.S. Application Data

(63) Continuation of application No. 14/488,052, filed on Sep. 16, 2014, now Pat. No. 10,103,421.

(51) Int. Cl.
| | |
|---|---|
| *H01Q 1/12* | (2006.01) |
| *H04W 88/08* | (2009.01) |
| *H01Q 1/42* | (2006.01) |
| *H01Q 1/24* | (2006.01) |
| *F24D 19/02* | (2006.01) |

(52) U.S. Cl.
CPC ............. *H01Q 1/12* (2013.01); *F24D 19/02* (2013.01); *H01Q 1/125* (2013.01); *H01Q 1/1207* (2013.01); *H01Q 1/1228* (2013.01); *H01Q 1/1242* (2013.01); *H01Q 1/1264* (2013.01); *H01Q 1/246* (2013.01); *H01Q 1/42* (2013.01); *H04W 88/08* (2013.01)

(58) Field of Classification Search
None
See application file for complete search history.

(56) References Cited

U.S. PATENT DOCUMENTS

| | | | | |
|---|---|---|---|---|
| 5,641,141 | A * | 6/1997 | Goodwin | H01Q 1/12 248/218.4 |
| 6,486,399 | B1 | 11/2002 | Armstrong | |
| 6,940,469 | B2 * | 9/2005 | Gottl | H01Q 1/246 343/872 |
| 6,982,680 | B2 * | 1/2006 | Janoschka | H01Q 1/1242 343/878 |

(Continued)

*Primary Examiner* — Dameon E Levi
*Assistant Examiner* — Ab Salam Alkassim, Jr.
(74) *Attorney, Agent, or Firm* — Sterne, Kessler, Goldstein & Fox, P.L.L.C.

(57) ABSTRACT

An assembly for mounting a wireless access point includes a base panel configured to be mounted to a post and to support the access point. The assembly includes a shroud configured to at least partially surround the base panel, the access point, and the post. The assembly can also include an antenna support configured to support an antenna coupled to the access point and configured to rotate between a first position and a second position. A method of mounting the access point to the post includes mounting, to the post, the base panel supporting the access point. The method also includes, after mounting the base panel to the post, coupling the shroud to the base panel such that the shroud at least partially surrounds the base panel, the access point, and the post.

20 Claims, 8 Drawing Sheets

(56) References Cited

U.S. PATENT DOCUMENTS

| | | | |
|---|---|---|---|
| 7,071,885 B2* | 7/2006 | Noro | H01Q 1/12 |
| | | | 343/712 |
| 7,227,505 B2 | 6/2007 | Kim | |
| 8,344,953 B1* | 1/2013 | Gilbrech | H01Q 3/02 |
| | | | 343/700 MS |
| 8,564,497 B1 | 10/2013 | Dickie | |
| 8,593,370 B2 | 11/2013 | Caldwell | |
| 8,669,915 B2* | 3/2014 | Wilkinson | G06K 19/07749 |
| | | | 343/872 |
| 9,966,649 B2 | 5/2018 | Christie | |
| 9,997,825 B2* | 6/2018 | Hendrix | H01Q 1/246 |
| 10,135,130 B1* | 11/2018 | Bouchard | H01Q 1/42 |
| 10,476,138 B2* | 11/2019 | Gonsowski | H01Q 1/246 |
| 2002/0053996 A1 | 5/2002 | Ianello | |
| 2002/0184833 A1* | 12/2002 | Jones | H01Q 1/246 |
| | | | 52/40 |
| 2004/0066353 A1* | 4/2004 | Ernest Ehlen | H01Q 1/1242 |
| | | | 343/891 |
| 2004/0248511 A1* | 12/2004 | Flynn | H04B 7/155 |
| | | | 455/7 |
| 2005/0030250 A1* | 2/2005 | Gottl | H01Q 1/246 |
| | | | 343/878 |
| 2008/0031585 A1 | 2/2008 | Solheid | |
| 2010/0026604 A1* | 2/2010 | Caldwell | H01Q 1/1242 |
| | | | 343/890 |
| 2011/0156984 A1 | 6/2011 | Caldwell | |
| 2013/0113679 A1 | 5/2013 | Wang | |
| 2013/0142372 A1* | 6/2013 | Harwood | H04R 1/028 |
| | | | 381/334 |
| 2014/0220903 A1 | 8/2014 | Schulz | |
| 2014/0225803 A1* | 8/2014 | Huerta | H01Q 21/0087 |
| | | | 343/872 |
| 2014/0237909 A1 | 8/2014 | Gupta | |
| 2015/0043200 A1* | 2/2015 | Wilson | F21S 9/035 |
| | | | 362/145 |
| 2015/0045093 A1* | 2/2015 | Hansen, Sr. | H04M 1/0283 |
| | | | 455/561 |
| 2015/0138022 A1* | 5/2015 | Takahashi | H01Q 1/1242 |
| | | | 343/702 |
| 2015/0349399 A1* | 12/2015 | Lasier | H01Q 1/06 |
| | | | 343/721 |
| 2015/0371571 A1* | 12/2015 | Hager | H04W 88/08 |
| | | | 348/552 |
| 2016/0014843 A1* | 1/2016 | Burrell | F16M 11/00 |
| | | | 455/561 |
| 2016/0066476 A1* | 3/2016 | Gu | H04W 88/08 |
| | | | 361/715 |
| 2016/0365624 A1* | 12/2016 | Maley | H01Q 1/1228 |
| 2017/0307192 A1 | 10/2017 | LaFemina | |
| 2018/0108978 A1* | 4/2018 | Gonsowski | H01Q 1/02 |
| 2018/0277921 A1* | 9/2018 | Ming | H01Q 1/12 |
| 2018/0323503 A1* | 11/2018 | Bouchard | H01Q 1/42 |
| 2019/0165446 A1* | 5/2019 | Matchett | F21V 33/00 |
| 2019/0221913 A1* | 7/2019 | Castronova | H01Q 1/1242 |

* cited by examiner

DEVICES, ASSEMBLIES, AND METHODS FOR MOUNTING A WIRELESS ACCESS POINT TO A POST

CROSS-REFERENCE TO RELATED APPLICATIONS AND INCORPORATION BY REFERENCE

This application is a continuation of and claims priority to U.S. patent application Ser. No. 14/488,052, filed Sep. 16, 2014, titled "Devices, Assemblies, and Methods for Mounting a Wireless Access Point to a Post," which is incorporated by reference to in its entirety.

BACKGROUND

Field

The present invention is generally related to wireless networks and more specifically to devices, assemblies, and methods for mounting a wireless access point to a post.

Background

People are increasingly relying on network connectivity. For example, people rely on network connectivity to provide access email, the Internet, mobile applications, centralized databases, and information management systems. Accordingly, indoor and outdoor wireless networks are becoming increasingly important. Often the desired location, for example, parks, streets, buildings, and outdoor venues, in which these wireless networks are installed must be retro-fitted with the necessary network equipment. Unfortunately, the retro-fitted equipment is typically visually obtrusive and architecturally incongruent with the desired location.

Accordingly, there is need for devices, assemblies, and methods for mounting network equipment, for example, a wireless access point, at the desired location in a manner that attractively conceals the equipment to help prevent the network equipment from being an visual eyesore while also allowing the equipment to function properly.

BRIEF SUMMARY

In some embodiments, an assembly for mounting a wireless access point and an antenna to a post includes a base panel configured to be mounted to the post and to support the wireless access point. The assembly also includes a shroud configured to at least partially surround the base panel, the wireless access point supported by the base panel, and the post. The base panel and the wireless access point can be positioned entirely within an interior volume defined by the shroud, and at least a portion of the post can be positioned within the interior volume defined by the shroud.

In some embodiments, an assembly for mounting a wireless access point and an antenna to a post includes a base panel configured to be mounted to the post and to support the wireless access point. The assembly also includes a wireless access point mounting bracket coupled to the base panel and configured to secure a wireless access point to the base panel. Further, the assembly includes an antenna support configured to support the antenna. The antenna support is rotatably coupled to the wireless access point mounting bracket. The antenna support rotates relative to the base panel and between a first position and a second position. The assembly also includes a shroud configured to at least partially surround the base panel, the wireless access point supported by the base panel, and the post.

In some embodiments, a device for enclosing a wireless access point mounted to a post includes a shroud defining an interior volume configured to at least partially receive the wireless access point and a portion of the post. The shroud at least partially surrounds the wireless access point and the post.

In some embodiments, a method of mounting a wireless access point to a post includes mounting, to the post, a base panel supporting the wireless access point. The method also includes, after mounting the base panel to the post, coupling a shroud to the base panel such that the shroud at least partially surrounds the base panel, the wireless access point supported by the base panel, and the post.

Further features and advantages, as well as the structure and operation of various embodiments, are described in detail below with reference to the accompanying drawings. It is noted that the embodiments of the invention are not limited to the specific embodiments described herein. Such described embodiments are presented herein for illustrative purposes only. Additional embodiments will be apparent to persons skilled in the relevant art(s) based on the teachings contained herein.

BRIEF DESCRIPTION OF THE DRAWINGS

Embodiments will now be described, by way of example only, with reference to the accompanying schematic drawings in which.

Figure 1:
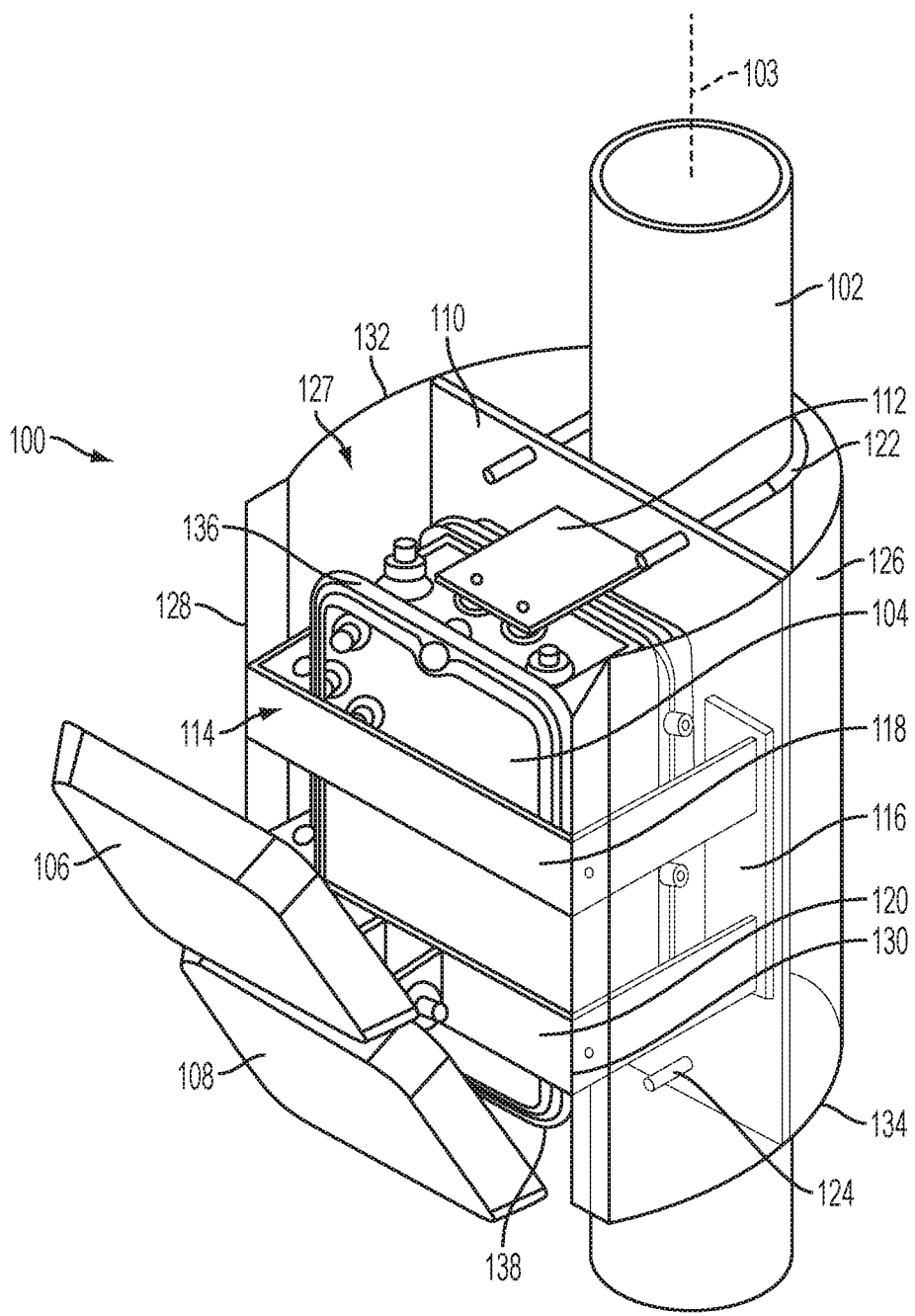
FIG. 1 illustrates a perspective view of a wireless access point mounting assembly according to an embodiment.

Features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

While the invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

The embodiments described, and references in the specification to "one embodiment," "an embodiment," "an example embodiment," "an example," "some embodiments," etc., indicate that the embodiments described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described.

Referring generally to the figures, devices, assemblies, and methods for mounting a wireless access point to a post are shown and described.

Figure 5:
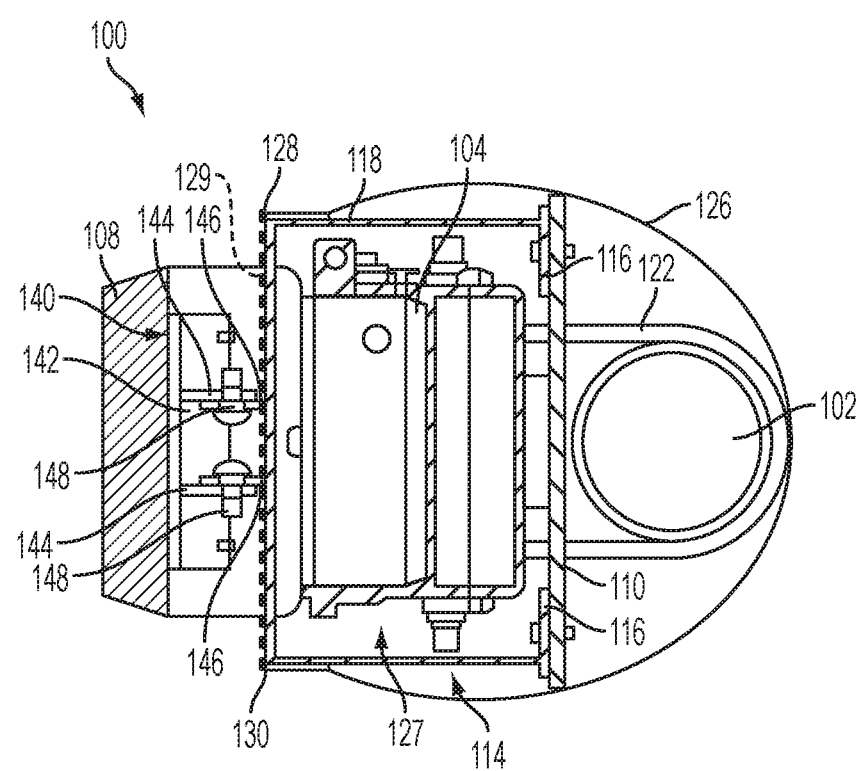
FIG. 5 illustrates a cross-sectional view of the wireless access point mounting assembly of FIGS. 1-4 taken along line A-A in FIG. 3.
Figure 6:
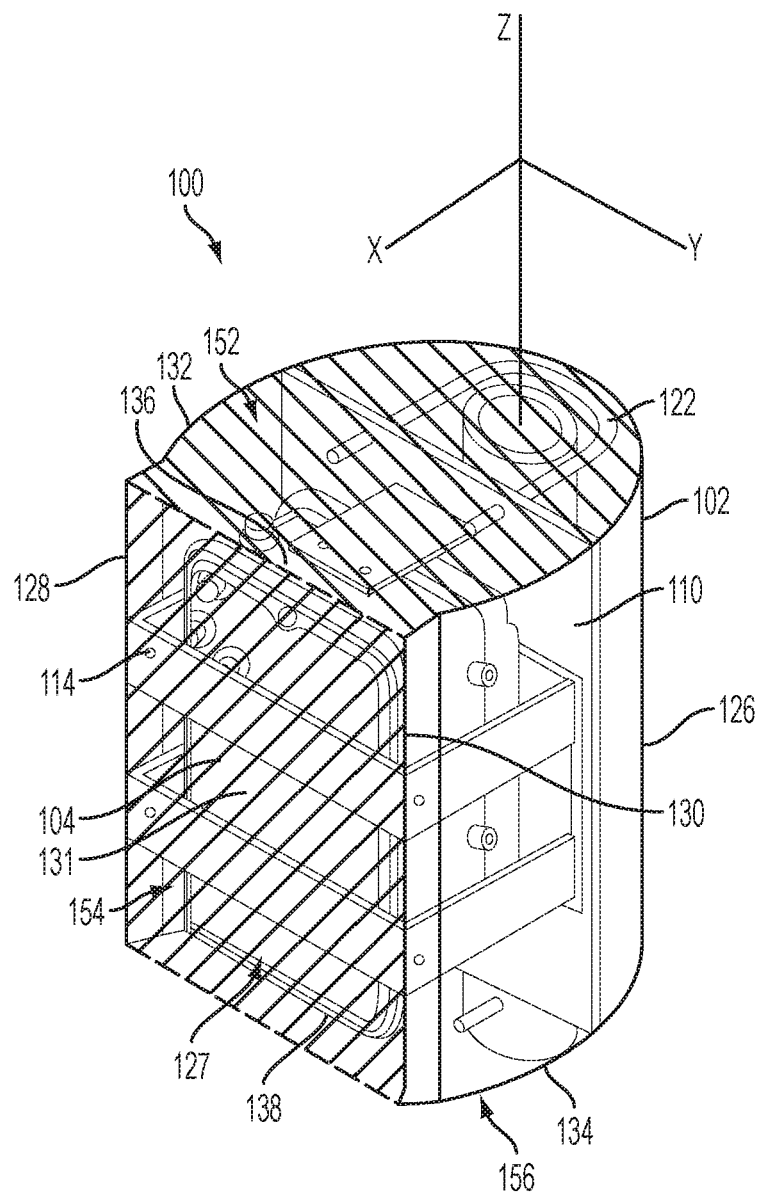
FIG. 6 illustrates a perspective view of the wireless access point mounting assembly of FIGS. 1-5 with the antennas removed for illustration purposes.
Figure 7:
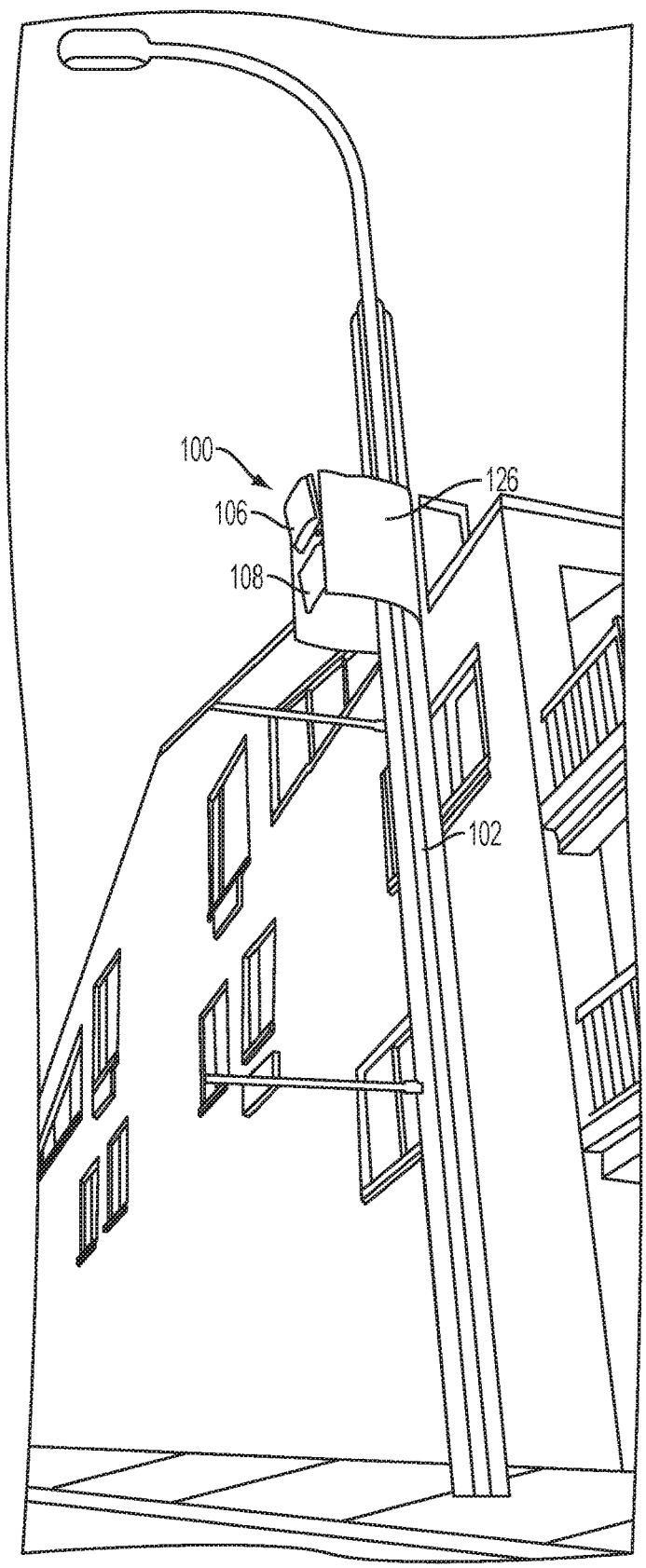
FIG. 7 illustrates a perspective view of a wireless access point mounting assembly according to another embodiment.

FIGS. 1-6 illustrate a wireless access point mounting assembly 100 according to an embodiment. Wireless access point mounting assembly 100 is configured to mount a wireless access point 104 to a post 102. Post 102 is a slender object—its width is small in proportion to its length—that extends along a longitudinal axis 103. Although post 102 is illustrated as having a circular cross-sectional shape, post 102 may have a non-circular cross-sectional shape, for example, a square, rectangle, triangle, ellipse, or any other suitable non-circular shape. In some embodiments, longitudinal axis 103 of post 102 is substantially vertical. In some embodiments, longitudinal axis 103 of post 102 is not substantially vertical, for example, substantially horizontal. In some embodiments, post 102 may have a shape that varies along longitudinal axis 103. In some embodiments, post 102 is a post that supports a lamp and extends from the ground as shown in FIG. 7.

Wireless access point 104 is part of a wireless network, for example, a wireless local area network (WLAN). Access point 104 wirelessly couples a compatible computational device, for example, a computer, a game console, a mobile phone, an MP3 player, a personal digital assistant (PDA), or any other suitable computational device, to the network. In some embodiments, access point 104 is one of a plurality of access points that compose, at least in part, the network. In some embodiments, access point 104 is a WiFi access point that is compatible with the 802.11 WLAN specification. Access point 104 can be configured for either indoor or outdoor use. Access point 104 can be either single or dual band.

In some embodiments, access point 104 is operatively coupled to one or more external antennas, for example, by one or more plenum cables. As shown in FIGS. 1-4, for example, access point 104 is operatively coupled to two external antennas 106 and 108. Depending on the application, antennas 106 and 108 can be omnidirectional, dipost, or directional antennas, and can be single or dual band antennas. In some embodiments, each antenna 106 and 108 can be a directional, single band antenna. Antennas 106 and 108 can be configured for either indoor or outdoor use.

Referring collectively to FIGS. 1-6, wireless access point mounting assembly 100 includes a base panel 110 configured to be mounted to post 102 and configured to support wireless access point 104. In some embodiments, base panel 110 is configured to be mounted directly to post 102, for example, using first and second post mounting brackets 122 and 124 as further described below. Base panel 110 can have any suitable shape. For example, as best seen in FIGS. 1-4, base panel 110 is substantially rectangular and planar. In other embodiments, base panel 110 can have any other suitable shape. For example, base panel 110 can be square and non-planar, and define cavities configured to receive a portion of access point 104.

Figure 2:
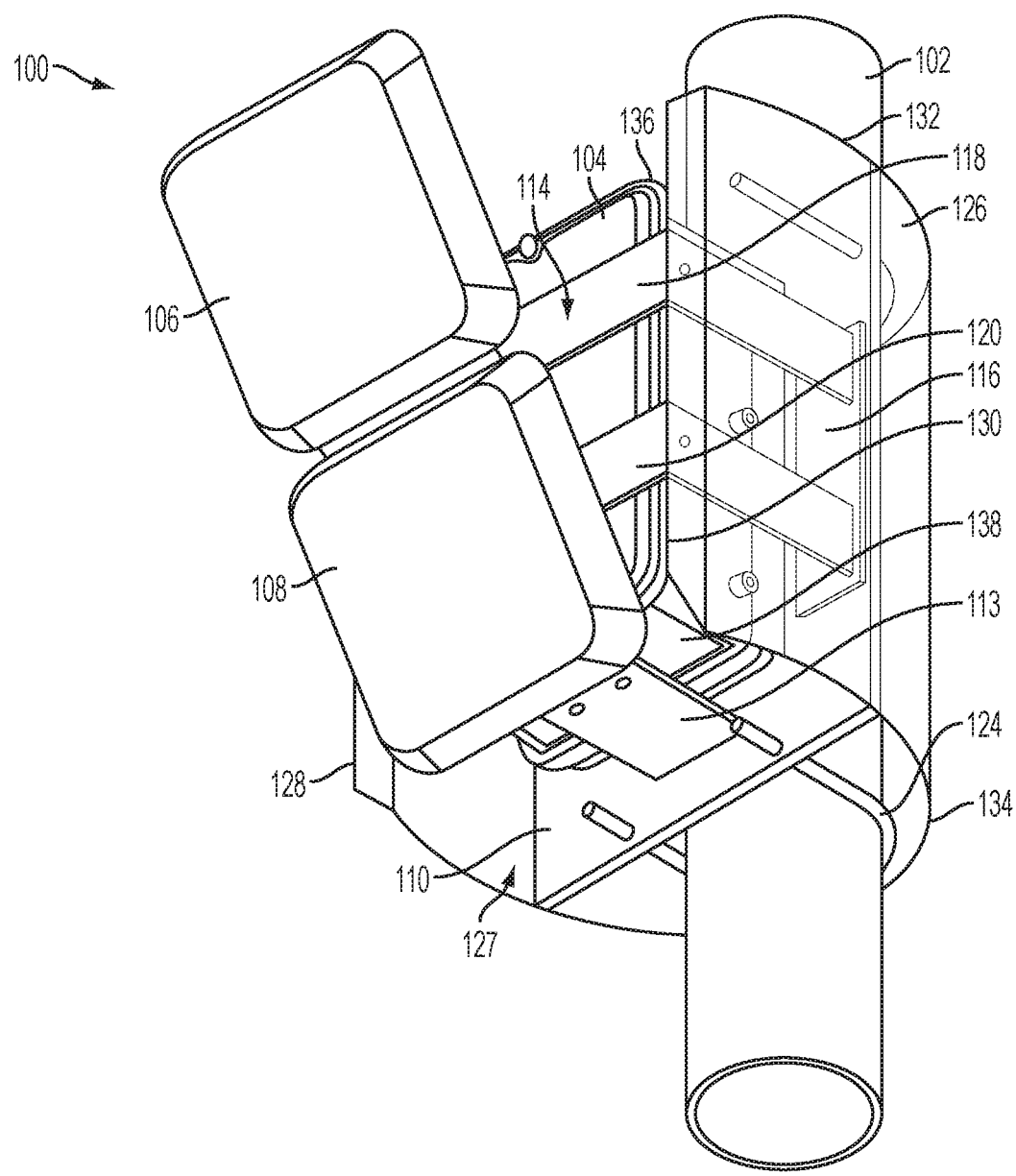
FIG. 2 illustrates another perspective view of the wireless access point mounting assembly of FIG. 1.

Referring collectively to FIGS. 1 and 2, wireless access point assembly 100 also includes a pair of opposing supporting panels 112 and 113 that extend from base panel 110 away from post 102. The gap between supporting panels 112 and 113 is sized to closely receive access point 104 in between panels 112 and 113. As shown in FIG. 1, supporting panel 112 is positioned above wireless access point 104, and as shown in FIG. 2, supporting panel 113 is positioned below wireless access point 104. Supporting panels 112 and 113 extend substantially perpendicular to the plane defined by base panel 110. In other embodiments, supporting panels 112 and 113 extend at a non-90-degree angle relative to the plane defined by base panel 110. Supporting panels 112 and 113 can be rectangular and planar in some embodiments. In other embodiments, supporting panels 112 and 113 can be any other suitable shape. For example, supporting panels 112 and 113 can be square and non-planar, and define cavities configured to closely receive portions of access point 104. Although in FIGS. 1 and 2 the width of supporting panels 112 and 113 is substantially less than the width of base panel 110, the width of supporting panels 112 and 113 can be substantially equal to the width of base panel 110 in some embodiments. Supporting panels 112 and 113 can be integral with base panel 110 or separate, but coupled to, base panel 110.

Figure 4:
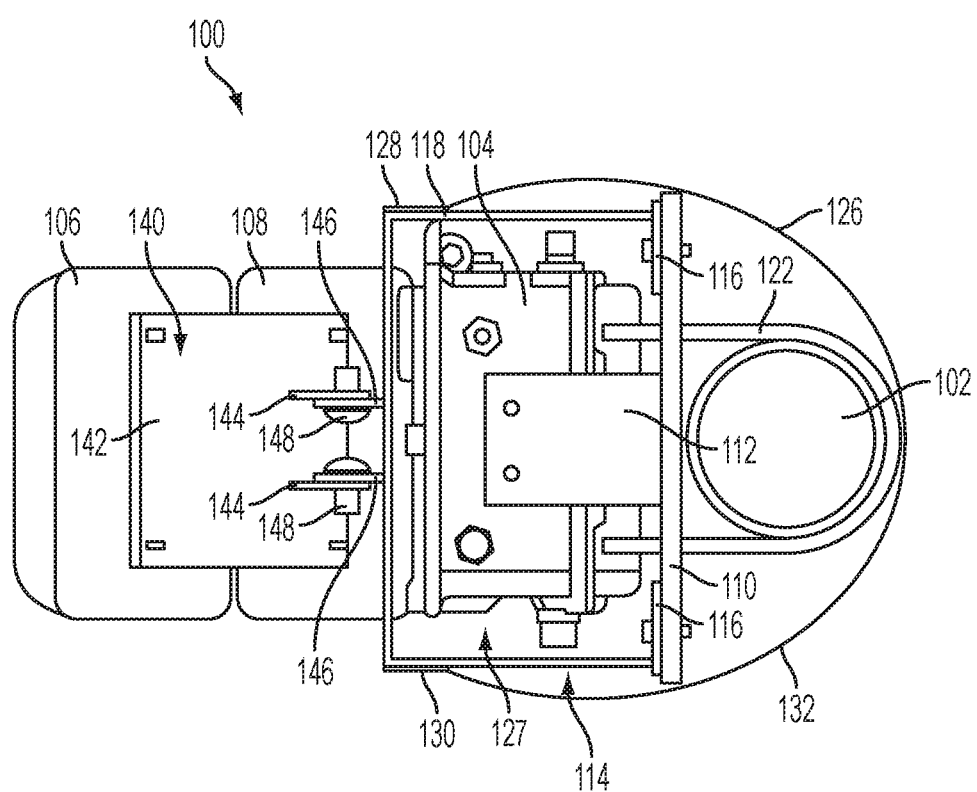
FIG. 4 illustrates a plan view of the wireless access point mounting assembly of FIGS. 1-3

Wireless access point mounting assembly 100 also includes a wireless access point mounting bracket 114 that is coupled to base panel 110 and is configured, in some embodiments, to secure access point 104 to base panel 110. As used in this application, "coupled to" means coupled directly to or coupled indirectly to. In some embodiments, as best seen in FIGS. 4 and 5, wireless access point mounting bracket 114 includes a pair of mounting flanges 116 that are configured to be mounted flushly against base panel 110. Wireless access point mounting bracket 114 includes first and second bracket arms 118 and 120 that extend from the pair of mounting flanges 116. In some embodiments, first and second bracket arms 118 and 120 are substantially U-shape as best seen in FIGS. 1 and 6. Accordingly, each of first and second bracket arms 118 and 120 wraps around access point 104 to secure access point 104 to base panel 110. Wireless access point mounting bracket 114 can be integral with base panel 110 or separate, but coupled to, base panel 110.

Wireless access point mounting assembly 100 can include one or more post mounting brackets configured to secure base panel 110 to post 102 and, thus, mounting assembly 100 to post 102. In some embodiments, as best seen in FIGS. 1, 2, 3, and 6, wireless access point mounting assembly 100 includes a first post mounting bracket 122 and a second post mounting bracket 124 that are coupled to base panel 110 and configured to secure base panel 110 to post 102. For example, as best seen in FIGS. 1, 2, and 4-6, first and second post mounting brackets 122 and 124 are substantially U-shaped, in some embodiments, such that each post mounting bracket 122 and 124 is coupled to base panel 110 at one end, extends around post 102, and is coupled to base panel 110 at the other end. In some embodiments, referring to FIGS. 1 and 2, the ends of post mounting brackets 122 and 124 extend through holes defined by base panel 110. The ends of first and second post mounting brackets 122 and 124 can be threaded for operatively coupling with threaded nuts (not shown). The threaded nuts can be tightened to clamp base panel 110 against post 102. In some embodiments, this threaded adjustment allows first and second post mounting brackets 122 and 124 to accommodate a variety of sizes of post 102.

In some embodiments, the post mounting brackets can have other suitable, non-U-shape configurations, for example, pendant mounting brackets, post clamp mounting brackets, band clamp mounting brackets, or any other suitable post mounting bracket configuration.

Referring collectively to FIGS. 1-6, wireless access point mounting assembly 100 can include a shroud 126 configured to at least partially surround base panel 110, access point 104 supported by base panel 110, and post 102. As used in this application, "to at least partially surround" means that at least a portion of a surrounded object is either (1) in the area bounded by (a) an open cross-sectional shape along a plane perpendicular to longitudinal axis 103 of post 102 of the surrounding object and (b) an imaginary line extending from the ends of the cross-sectional shape of the surrounding object or (2) in the area bounded by a closed cross-sectional shape of the surrounding object. For example, referencing FIG. 5, shroud 126 has an open substantially U-shaped cross-sectional shape along a plane perpendicular to longitudinal axis 103 of post 102, and at least a portion of each of base panel 110, access point 104, and post 102 is in the area bounded by (a) the open U-shaped cross-sectional shape of shroud 126 and (b) an imaginary line 129 extending from the ends of the open U-shaped cross-sectional shape of shroud 126. Accordingly, shroud 126 at least partially surrounds base panel 110, access point 104, and post 102 in the embodiment illustrated in FIGS. 1-6. In some embodiments, shroud 126 at least partially surrounds one or more of first and second post mounting brackets 122 and 124, wireless access point mounting bracket 114, and first and second antennas 106 and 108.

In some embodiments, shroud 126 is configured to entirely surround base panel 110, access point 104 supported by base panel 110, and post 102. As used in this application, "to entirely surround" means that a surrounded object is either (1) entirely in the area bounded by (a) an open cross-sectional shape along a plane perpendicular to longitudinal axis 103 of post 102 of the surrounding object and (b) an imaginary line extending from the ends of the cross-sectional shape of the surrounding object or (2) entirely in the area bounded by a closed cross-sectional shape of the surrounding object. For example, again referencing FIG. 5, shroud 126 has an open substantially U-shaped cross-sectional shape along a plane perpendicular to longitudinal axis 103 of post 102, and each of base panel 110, access point 104, and post 102 is entirely in the area bounded by the open U-shaped cross-sectional shape of shroud 126 and imaginary line 129 extending from the ends of the open U-shaped cross-sectional shape of shroud 126. Accordingly, shroud 126 entirely surrounds base panel 110, access point 104, and post 102 in the embodiment illustrated in FIGS. 1-6. In some embodiments, shroud 126 entirely surrounds one or more of first and second post mounting brackets 122 and 124, wireless access point mounting bracket 114, and first and second antennas 106 and 108.

In some embodiments, shroud 126 entirely surrounds base panel 110, access point 104, and post 102 and at least partially surrounds one or more of first and second post mounting brackets 122 and 124, wireless access point mounting bracket 114, and first and second antennas 106 and 108.

As explained above, shroud 126 can have an open cross-sectional shape along a plane perpendicular to longitudinal axis 103 of post 102 with a first vertical edge 128 and a second vertical edge 130 separated by a gap in some embodiments. The gap between first vertical edge 128 and second vertical edge 130 is sized to receive base panel 110, access point 104, and a portion of post 102, in some embodiments, and in some embodiments, to also receive first and second post mounting brackets 122 and 124, wireless access point mounting bracket 114, and first and second antennas 106 and 108.

As shown in FIGS. 1-6, the open cross-sectional shape of shroud 126 can be substantially U-shaped along a plane perpendicular to longitudinal axis 103 of post 102. As best seen in FIG. 5, a width of a gap between first vertical edge 128 and second vertical edge 130 is about equal to the maximum width of the open U-shape cross-sectional shape of shroud 126. In other embodiments, shroud 126 can have any other suitable open non-U-shape cross-sectional shape. In some embodiments, a width of a gap between first vertical edge 128 and second vertical edge 130 is the maximum width of the open cross-sectional shape of shroud 126. In other embodiments, a width of a gap between first vertical edge 128 and second vertical edge 130 is substantially less than the maximum width of the open cross-sectional shape of shroud 126.

Shroud 126 defines an interior volume 127. Interior volume 127 is bounded by shroud 126 and at least one opening exposing interior volume 127 to the atmosphere surrounding shroud 126. As used in this application, an opening that bounds interior volume 127 is an imaginary surface that imitates the shape that would be obtained by attaching a plastic wrap to the edges of shroud 126 with a zero pressure difference between interior volume 127 and the atmosphere surrounding shroud 126. For example, referencing FIG. 6, shroud 126 defines interior volume 127 which is bounded by shroud 126 and an opening consisting of a first imaginary surface portion 152 on a first side (e.g., a top side) of mounting assembly 100, a second imaginary surface portion 154 on a second side (e.g., a front side) of mounting assembly 100, and a third imaginary surface portion 156 on a third side (e.g., a bottom side) of mounting assembly 100.

In some embodiments as shown in FIG. 6, an opening bounding interior volume 127 spans two or more sides of mounting assembly 100. A portion of the opening spanning one side (for example, second imaginary surface portion 154) can be configured to receive base panel 110, access point 104, and a portion of post 102 along a first direction, for example, the x-direction as illustrated in FIG. 6. A portion of the opening spanning a second side (for example, third imaginary surface portion 156) can be configured to allow post 102, which is at least partially surrounded by shroud 126, to extend from interior volume 127 into the surrounding atmosphere in a second direction, for example, the negative z-direction as shown in FIG. 6. In some embodiments, the opening bounding interior volume 127 includes a third portion that spans a third side (for example, first imaginary surface portion 152) that is configured to allow post 102 to extend from interior volume 127 into the surrounding atmosphere in a third direction, for example, the positive z-direction as shown in FIG. 6.

In some embodiments, as shown in FIGS. 1-6, base panel 110 and access point 104 are positioned entirely within interior volume 127 defined by the shroud 126, and at least a portion of post 102 is positioned within interior volume 127. In such embodiments, referring to FIG. 6, first vertical edge 128 and second vertical edge 130 of shroud 126 terminates beyond a front surface 131 of access point 104 in a positive x-direction, a first horizontal edge 132 terminates beyond a top surface 136 of access point 104 in a positive z-direction (a direction parallel to longitudinal axis 103 of post 102) perpendicular to the x-direction, and a second horizontal edge 134 terminates beyond a bottom surface 138 of access point 104 in a negative z-direction. And portions of shroud 126 are outside of access point 104 on both sides along a y-direction, which is perpendicular to the x-direction and the z-direction.

In some embodiments, one or more of first and second post mounting brackets 122 and 124, wireless access point mounting bracket 114, and first and second antennas 106 and 108 are at least partially or, in some embodiments, entirely positioned in interior volume 127.

In some embodiments, shroud 126 is formed from a flat, single sheet of material. Shroud 126 can be a developable surface-formed from a flat sheet without stretching. Shroud 126 can be a non-developable surface-formed from a flat sheet with stretching.

In some embodiments, shroud 126 is flexible and resilient. That is, shroud 126 can be flexed to receive base panel 110 and access point 104 in interior volume 127, and then upon release, shroud 126 returns to a preformed shape.

In some embodiments, the color of shroud 126 matches the color of post 102. Matching the color of shroud 126 to post 102 can help make mounting assembly 100 visually unobtrusive.

In some embodiments, shroud 126 is configured to be releasably coupled to base panel 110. As used in this application, "releasably coupled" means that shroud 126 can be coupled to base panel 110 after base panel 110 is coupled to post 102. In some embodiments, shroud 126 is releasably coupled to base panel 110 using fasteners, adhesive, a press-fit, or any other suitable releasably coupling method or device.

As shown in FIGS. 1-6, shroud 126 is releasably coupled directly to access point mounting bracket 114 (and thus indirectly coupled to base panel 110). For example, first and second vertical edges 128 and 130 of shroud 126 are releasably coupled to first and second bracket arms 118 and 120 of access point mounting bracket 114 in some embodiments. So at one end, shroud 126 is releasably coupled to wireless access point mounting bracket 114. Shroud 126 then extends around post 102 and is releasably coupled at the other end to wireless access point mounting bracket 114.

In some embodiments, mounting assembly 100 having shroud 126 can be used with a variety of different sized posts. Different sized posts can be accommodated by either tightening or adjusting post mounting brackets 122 and 124 or by selecting and using mounting brackets 122 and 124 configured for a particular size of post 102. Thus, the same shroud 126 can be used for a variety of different sized posts. That is, mounting assembly 100 having shroud 126 can accommodate a plurality of different sized posts up to a maximum size, which is dependent on the size of shroud 126 and how shroud 126 is coupled to base plate 110. In such embodiments, being able to use the same shroud 126 with a variety of different sized posts, helps reduce the inventory costs of the installer.

In some embodiments, shroud 126 conceals access point 104 from the visual view of network users when shroud 126 is releasably coupled to base panel 110, for example, when access point 104 is positioned entirely within interior volume 127 defined by shroud 126.

In some embodiments in which antennas 106 and 108 are directional antennas, shroud 126 does not intersect the direction of the wireless signals from antennas 106 and 108 when shroud 126 is releasably coupled to base panel 110. In some embodiments in which antennas 106 and 108 are omnidirectional or dipost antennas that generate a wireless signal in a plurality of directions, at least one of the plurality of directions is not intersected by shroud 126 when shroud 126 is releasably coupled to base panel 110.

Figure 3:
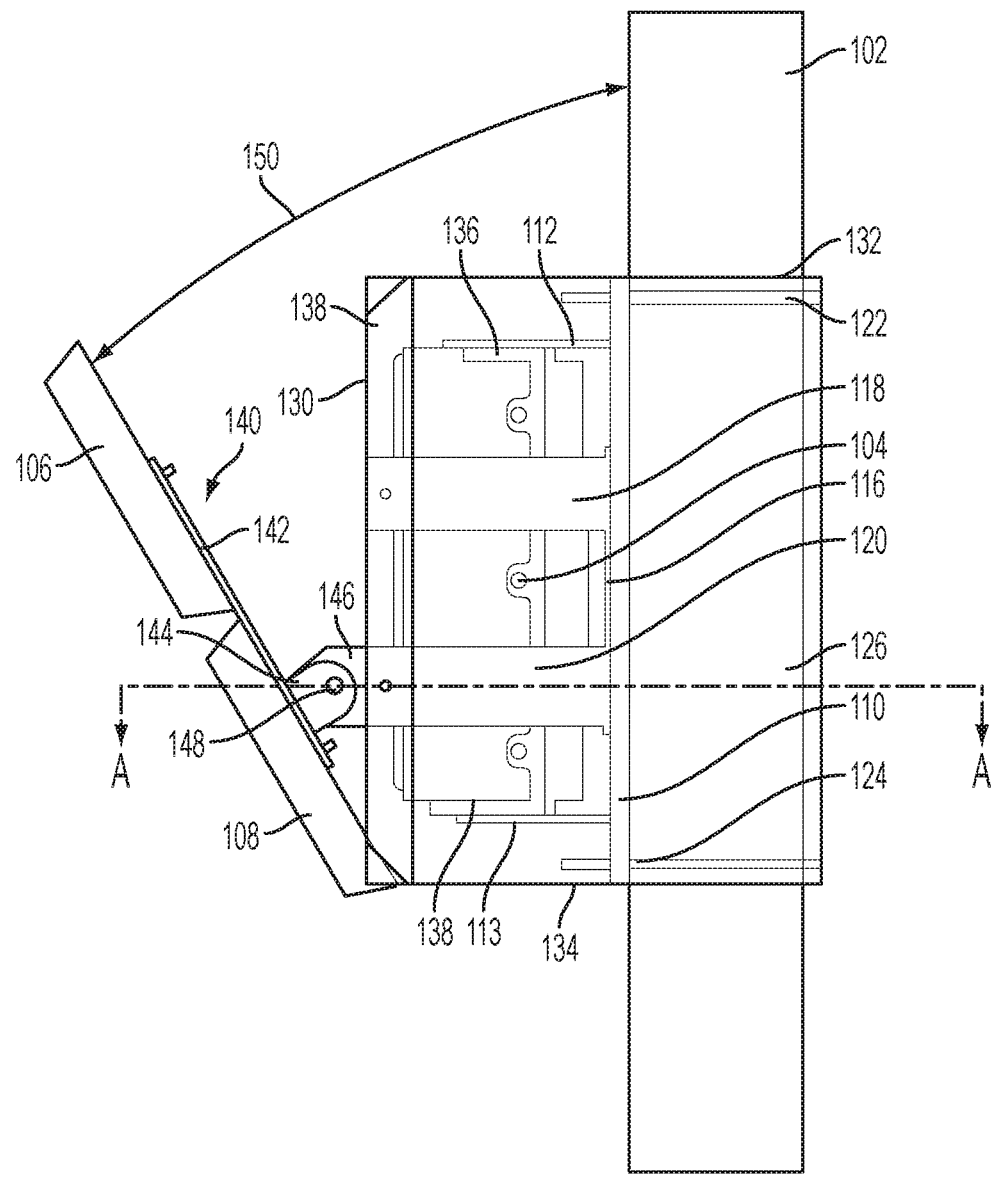
FIG. 3 illustrates a side view of the wireless access point mounting assembly of FIGS. 1-2.

In some embodiments, first and second antennas are rotatably coupled to base panel 110. For example, as shown in FIGS. 1-6, mounting assembly 100 includes an antenna support 140 configured to support one or more antennas, for example, first and second antennas 106 and 108, and rotatably coupled to base panel 110. In some embodiments, antenna support 140 comprises a base panel 142 that supports first and second antennas 106 and 108. Base panel 142 can have any suitable shape for supporting first and second antennas 106 and 108. For example, as best seen in FIGS. 3 and 4, base panel 142 can be substantially planar and rectangular.

In some embodiments, base panel 142 is rotatably coupled directly to access point mounting bracket 114. For example, as best seen in FIGS. 3 and 4, antenna support 140 can also include a pair of panels 144 extending from base panel 142. Panels 144 can be rotatably coupled to a corresponding pair of panels 146 extending from bracket 114, for example, from bracket arm 120 of bracket 114. Panels 144 can be rotatably coupled to panels 146 using any suitable rotatable coupling, for example, a pivot pin 148.

Base panel 142 of antenna support 140 can be configured to rotate relative to base panel 110 about an axis and anywhere between a first terminal position and a second terminal position. In some embodiments, base panel 142 of antenna support 140 is substantially parallel to base panel 110 and longitudinal axis 103 of post 102 at the first terminal position. And at the second terminal position (best seen in FIG. 3), a non-zero angle 150 is formed between base panel 110 (and longitudinal axis 103 of post 102) and base panel 142 of antenna support 140. In some embodiments, angle 150 is about 30 degrees at the second terminal position. In some embodiments, the axis about which base panel 142 rotates is substantially perpendicular to longitudinal axis 103 of post 102. For example, if longitudinal axis 103 of post 102 is vertical, the axis about which base panel 142 rotates is horizontal.

In some embodiments in which antenna support 140 is configured to support a directional antenna that focuses a wireless signal in a direction, an installer positions base panel 142 at a position between the first terminal position and the second terminal position such that the direction of the wireless signal is angled toward a desired area likely to have network users, for example, downward toward the ground when mounting assembly 100 is mounted to a lamp post.

Wireless access point 104 can be mounted to post 102 using any one of the above described embodiments. In some embodiments, a method of mounting wireless access point 104 to post 102 includes mounting base panel 110 to post 102. For example, base panel 110 can be mounted to post 102 using post mounting brackets 122 and 124. Wireless access point 104 can be mounted to base panel 110 before or after mounting base panel 110 to post 102. Then after mounting base panel 110 to post 102, shroud 126 can be releasably coupled to base panel 110 such that shroud 126 at least partially surrounds base panel 110, wireless access point 104 supported by base panel 110, and post 102. For example, referencing FIG. 6, the installer can align opening portion 154 with post 102 and then advance shroud 126 in the positive x-direction to a position as shown in FIGS. 1-6. Then shroud 126 can be, for example, releasably coupled to base panel 110.

Before coupling shroud 126 to base panel 110, an installer has easy access to base panel 110 and access point 104. Additionally, because shroud 126 is releasably coupled to base panel 110, shroud 126 can be removed after initially coupling shroud 126 to base panel 110 (in some embodiments), an installer can again gain access to wireless access point 104 for modification or replacement of access point 104.

Figure 8:
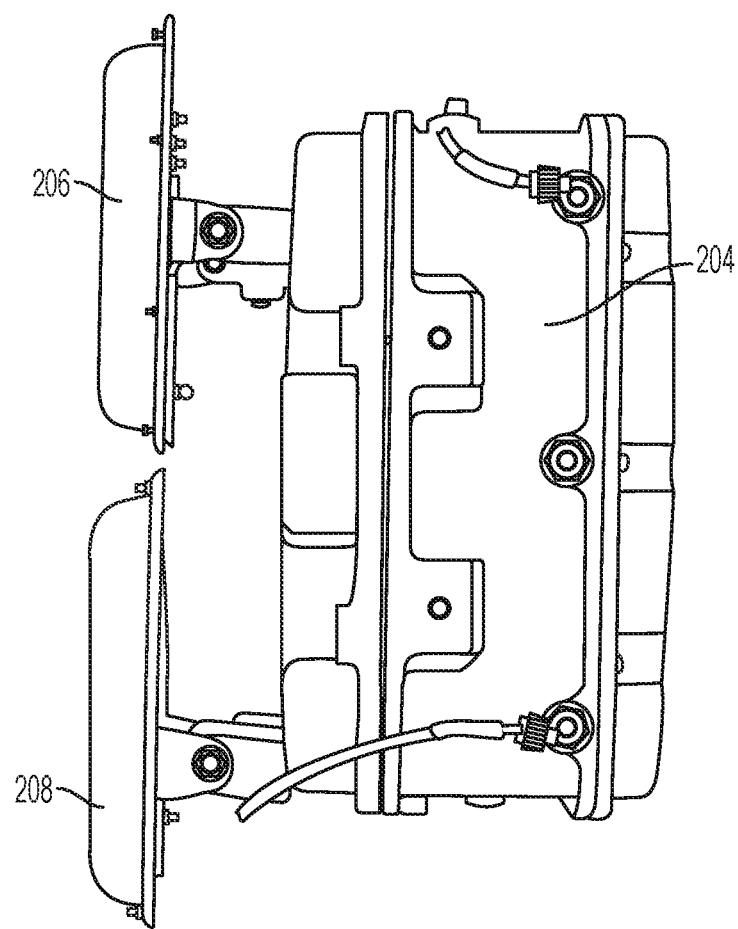
FIG. 8 illustrates a perspective view of a wireless access point according to another embodiment.

In some embodiments, one or more antennas are rotatably coupled directly to the wireless access point. Accordingly, in some embodiments, antenna support 140 can be omitted. For example, as shown in FIG. 8, first and second antennas 206 and 208 are rotatably coupled directly to a wireless access point 204.

In some embodiments, the mounting assembly can be configured to mount network devices other than a wireless access point. In some embodiments, the mounting assembly can be configured to mount electronic devices other than network devices.

While various embodiments of the present invention have been described above, it should be understood that they have been presented by way of example, and not limitation. It will be apparent to persons skilled in the relevant art that various changes in form and detail can be made therein without departing from the spirit and scope of the invention.

The present invention has been described above with the aid of functional building blocks and method steps illustrating the performance of specified functions and relationships thereof. The boundaries of these functional building blocks and method steps have been arbitrarily defined herein for the convenience of the description. Alternate boundaries can be defined so long as the specified functions and relationships thereof are appropriately performed. Any such alternate boundaries are thus within the scope and spirit of the claimed invention. Thus, the breadth and scope of the present invention should not be limited by any of the above-described exemplary embodiments, but should be defined only in accordance with the following claims and their equivalents.

What is claimed is:

1. An assembly for mounting a wireless access point and an antenna to a post having a longitudinal axis, the assembly comprising:
    a base panel configured to be mounted to the post and to support the wireless access point;
    a wireless access point mounting bracket coupled to the base panel and configured to secure the wireless access point to the base panel; and
    a single-sheet shroud configured to at least partially surround the base panel, the wireless access point supported by the base panel, and the post, the shroud defining an interior volume and having an open cross-sectional shape in a plane perpendicular to the longitudinal axis of the post, wherein the base panel and the wireless access point are positioned within the interior volume,
    wherein a first end of the shroud is coupled to the wireless access point mounting bracket and a second end of the shroud is coupled to the wireless access point mounting bracket.

2. The assembly of claim 1, wherein the interior volume is bounded by an opening spanning a first side, a second side, and a third side of the assembly.

3. The assembly of claim 1, wherein the shroud is configured to at least partially surround the antenna such that at least a portion of the antenna is positioned within the interior volume.

4. The assembly of claim 1, wherein the cross-sectional shape is U-shaped.

5. The assembly of claim 1, further comprising an antenna support configured to support the antenna and rotatably coupled to the base panel such that the antenna support rotates between a first position and a second position.

6. The assembly of claim 5, wherein:
    the antenna support is substantially parallel to the base panel at the first position; and
    a non-zero angle between the base panel and the antenna support is formed at the second position.

7. The assembly of claim 6, wherein the angle between the base panel and the antenna support is about 30 degrees at the second position.

8. The assembly of claim 5, wherein the antenna support rotates about an axis substantially perpendicular to the longitudinal axis of the post.

9. The assembly of claim 5, further comprising:
    a wireless access point mounting bracket comprising a bracket arm coupled to the base panel, the bracket arm being configured to secure the wireless access point to the base panel, the bracket arm comprising a panel extending from the bracket arm,
    wherein the antenna support comprises a base panel that supports the antenna and a panel extending from the base panel that is rotatably coupled to the panel of the bracket arm by a pivot pin.

10. The assembly of claim 5, wherein the antenna support is configured to support more than one antenna.

11. The assembly of claim 1, wherein the shroud does not intersect at least one direction of the wireless signal from the antenna.

12. The assembly of claim 1, wherein the first end of the shroud is releasably coupled to the wireless access point mounting bracket and the second end of the shroud is releasably coupled to the wireless access point mounting bracket.

13. The assembly of claim 1, wherein the longitudinal axis of the post is substantially vertical.

14. The assembly of claim 1, wherein the post is an outdoor lamp post.

15. A device for enclosing a wireless access point mounted to a post having a longitudinal axis, the device comprising:
    a wireless access point mounting bracket configured to secure the wireless access point to a base panel; and
    a single-sheet shroud defining an interior volume configured to at least partially receive the wireless access point and a portion of the post such that the shroud at least partially surrounds the wireless access point and the post,
    wherein a first end of the shroud is coupled to the wireless access point mounting bracket and a second end of the shroud is coupled to the wireless access point mounting bracket, and
    wherein the shroud has an open cross-sectional shape in a plane perpendicular to the longitudinal axis of the post.

16. The device of claim 15, wherein the post is an outdoor lamp post.

17. The device of claim 15, wherein the cross-sectional shape is U-shaped.

18. The device of claim 15, wherein the antenna support is configured to support more than one antenna.

19. A method of mounting a wireless access point to a post having a longitudinal axis, the method comprising:
- mounting, to the post, an assembly comprising a base panel and a wireless access point mounting bracket securing the wireless access point to the base panel;
- after mounting the assembly to the post, coupling a first end and a second end of a single-sheet shroud to the wireless access point mounting bracket,
- wherein the single-sheet shroud has an open cross-sectional shape in a plane perpendicular to the longitudinal axis of the post to the base panel such that the shroud at least partially surrounds the base panel and the post.

20. The method of claim 19, wherein the assembly further comprises an antenna; and wherein the shroud does not intersect at least one direction of a wireless signal from the antenna.

* * * * *